J. A. WATSON.
COFFEE PERCOLATOR.
APPLICATION FILED MAY 9, 1913.
1,108,288.
Patented Aug. 25, 1914.
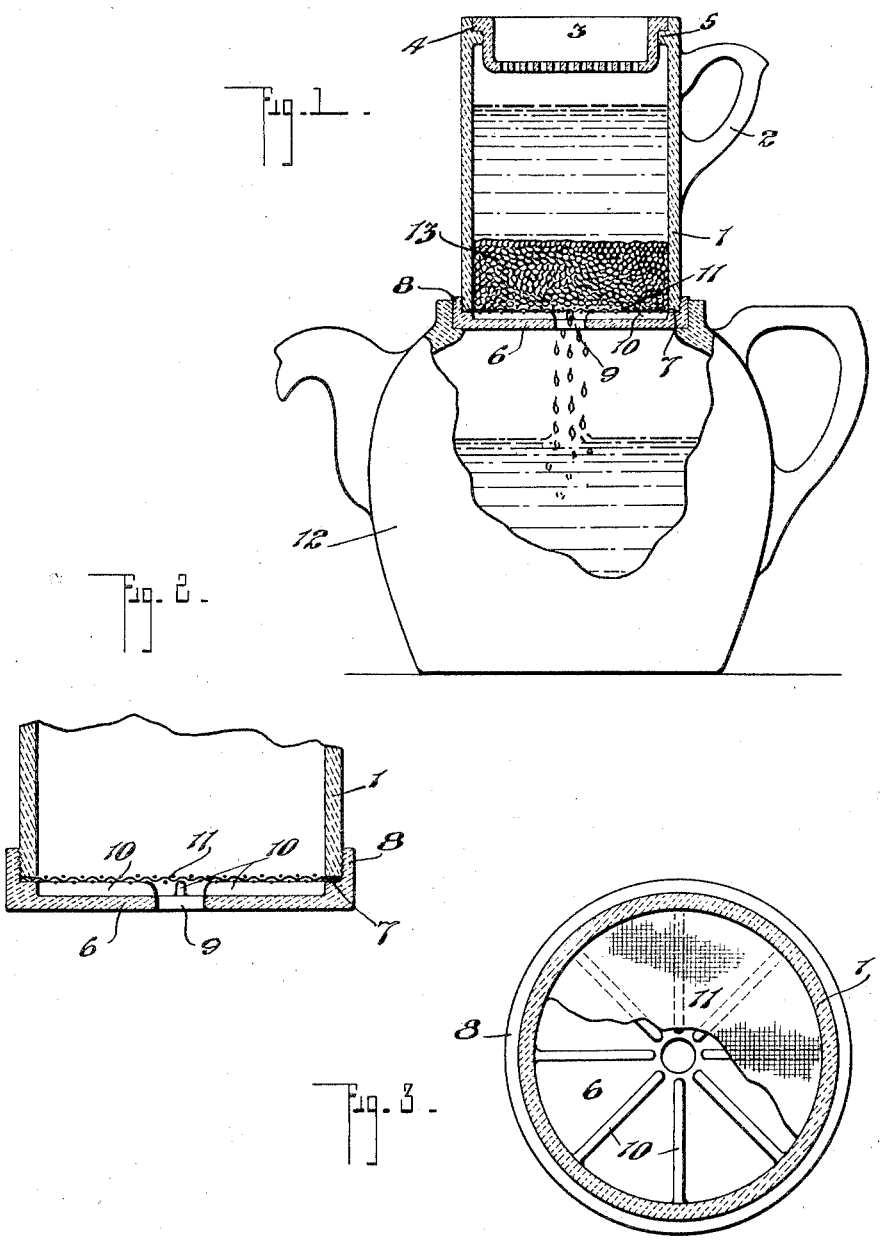

UNITED STATES PATENT OFFICE.

JAMES ALEXANDER WATSON, OF WINNIPEG, MANITOBA, CANADA.

COFFEE-PERCOLATOR.

1,108,288.  Specification of Letters Patent.  Patented Aug. 25, 1914.

Application filed May 9, 1913. Serial No. 766,541.

*To all whom it may concern:*

Be it known that I, JAMES ALEXANDER WATSON, of the city of Winnipeg, in the Province of Manitoba, Canada, have invented certain new and useful Improvements in Coffee-Percolators, of which the following is the specification.

The invention relates to an improvement in percolators particularly designed for percolating coffee and the object of the invention is to provide a simple and inexpensive percolator which can be applied on any pot and which is constructed with few parts so that it can be readily cleaned and kept sanitary.

A further object of the invention is to provide a percolator which of itself controls the time taken by the water to drain through the coffee grounds and a still further object of the invention is to provide a percolator constructed so that the straining element can be readily removed and renewed.

With the above and other objects in view which will become more apparent as the description proceeds the invention consists essentially in a more or less cylindrical receptacle provided with a suitable handle, a perforated top for the receptacle, a bottom releasably secured to the lower end of the receptacle and having a centrally located opening therein and a removable straining element located above the bottom and contained within the receptacle, the parts being arranged and constructed as hereinafter more particularly described and later pointed out in the appended claims.

Figure 1 represents a vertical sectional view through the complete device as applied on a pot, part of the pot being broken away to expose construction. Fig. 2 represents an enlarged detailed vertical sectional view through the lower end of the receptacle and the bottom. Fig. 3 represents a plan view of the parts appearing in Fig. 2.

In the drawing like characters of reference indicate corresponding parts in each figure.

1 represents in the present instance a more or less cylindrical receptacle having normally open upper and lower ends and provided with a handle 2.

3 represents a cup shaped perforated top supplied with an outstanding flange 4 which rests normally on an inturned flange 5 formed as a part of the receptacle.

6 represents a bottom fitted with an annular shoulder 7 and having an annular interiorly threaded flange 8 adjoining the shoulder designed to screw thread on the lower end of the receptacle which is provided with a meeting thread. The bottom is formed with a centrally located opening 9 and carries a number of ribs 10 which radiate from the opening to the shoulder.

11 represents a straining element, preferably filter paper cut in a more or less circular form and placed in position across the lower end of the receptacle. This element is held in position by its edges being jammed between the lower edge of the receptacle and the opposing face of the shoulder when the bottom is applied and screwed up on the receptacle. It will be noticed that an open space is reserved between the straining element and the bottom 6. Although I have mentioned particularly filter paper as the desirable straining element, still it will be understood that muslin or any other such cloth could be used. A fine wire gauze could also be substituted but I am not partial to this as I do not consider it sanitary to use the same filtering element twice and further I do not consider that metal elements should be used under any condition where good coffee is to be made. In this connection I might mention that the receptacle top and bottom are to be made from earthenware and that to get the best results it is desirable to use the percolator with a pot of similar material.

12 represents an earthenware pot on which I have applied the percolator, the percolator resting on the ledge of the pot when the top or cover of same is removed.

When it is desired to make coffee the coffee grounds 13 are placed in the receptacle, being supported by the filtering element. Boiling water is then poured into the receptacle through the perforated top and the water is then allowed to filter through and drop through the opening 9 into the pot 12. It is desirable to heat both the percolator and the pot prior to pouring in the water so that it will not be initially chilled. It will be seen that I can control the time it takes the water to filter through by enlarging or contracting the opening 9. This opening will be designed to allow the water to pass through slowly enough so that all the coffee flavor is extracted from the grounds when all the water is passed through.

I do not wish to be limited to the precise manner in which the bottom is secured to the receptacle nor to the manner in which the straining element is held within the percolator as various methods of securing these parts could be readily suggested and supplied without departing in the least from the spirit of the invention. It is not absolutely necessary to use the top 3 but it is desirable as by using it the water is more evenly spread over the coffee grounds.

What I claim as my invention is:—

1. A percolator comprising an open ended cylindrical casing having the bottom thereof screw threaded and provided with an inturned flange at the upper end, a perforated cup-shaped top resting on the flange, a bottom for the receptacle, said bottom having a centrally located opening therein and being provided with an annular shoulder and an annular interiorly threaded flange adjoining the shoulder and having the ribs passing radially between the opening and the shoulder and being screw threaded onto the lower end of the receptacle and a substantially circular straining element passing across the lower end of the receptacle and bearing on the shoulder, said straining element being free of the bottom, as and for the purpose specified.

2. A percolator comprising a receptacle, a bottom for the receptacle, said bottom having a centrally located opening therein and being provided with an annular shoulder, ribs radiating from said opening to said shoulder, a straining element resting on said ribs and said annular shoulder above said opening, said receptacle clamping the outer edges of said straining element against said shoulder when said receptacle and bottom are secured together.

Signed at Winnipeg this 14 day of April, 1913.

JAMES ALEXANDER WATSON.

In the presence of—
   G. S. ROXBURGH,
   ROLAND FOSTER.